Nov. 9, 1926. 1,606,632
G. A. HARRIS
SHADE
Filed Nov. 2, 1925  2 Sheets-Sheet 2
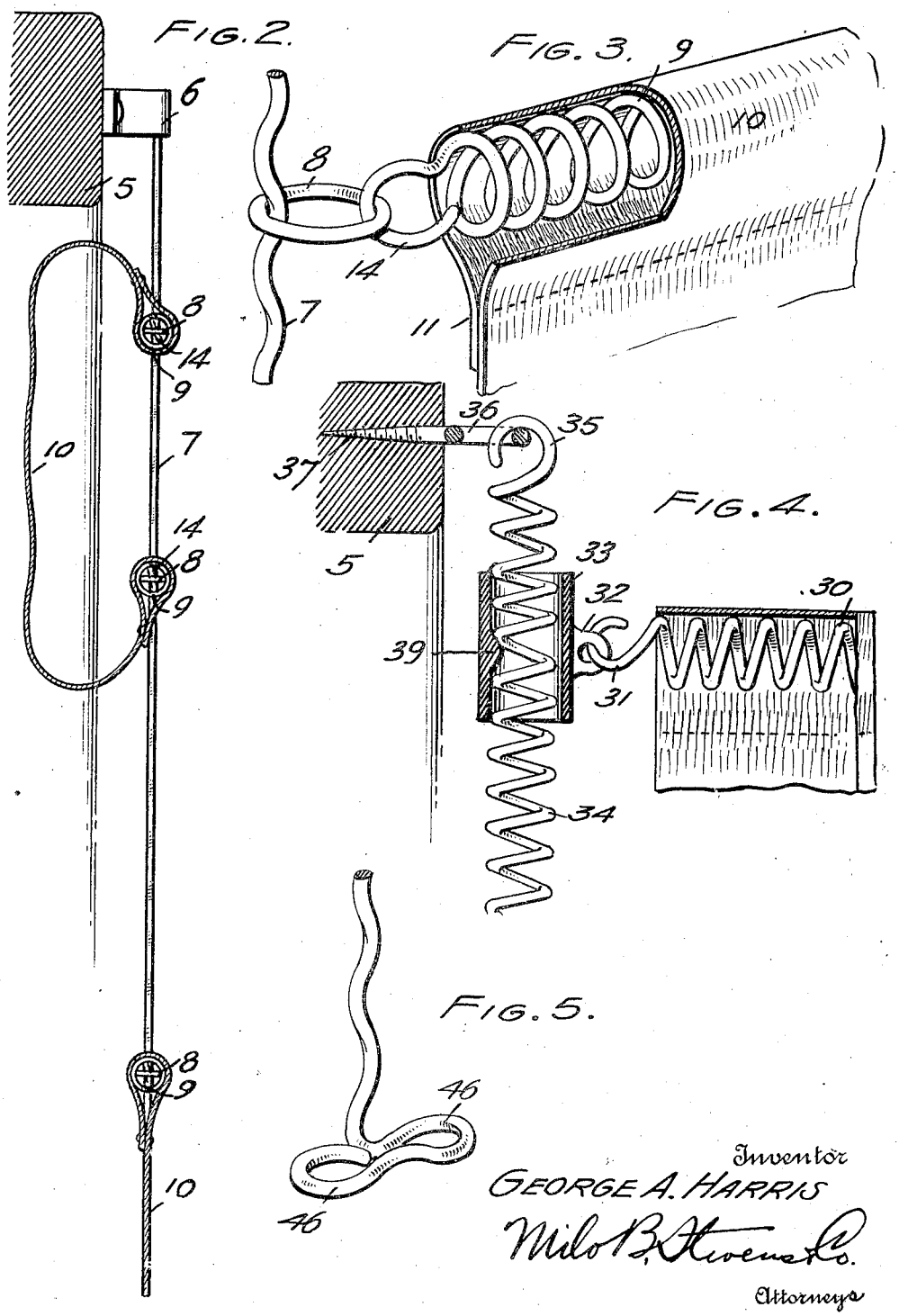

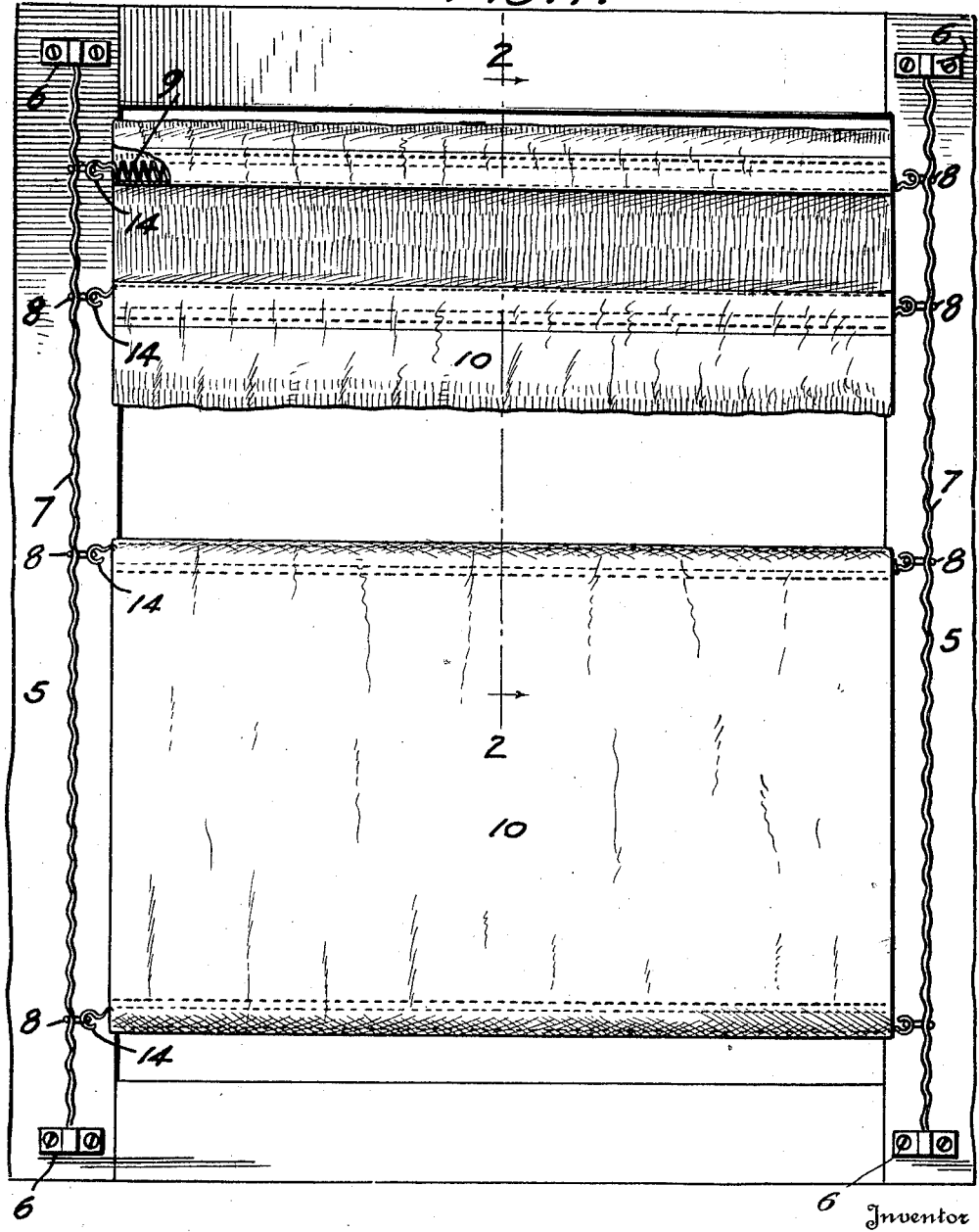

Patented Nov. 9, 1926.

1,606,632

UNITED STATES PATENT OFFICE.

GEORGE A. HARRIS, OF CHICAGO, ILLINOIS.

SHADE.

Application filed November 2, 1925. Serial No. 66,378.

This invention relates to shades or curtain especially adapted for use in connection with closed vehicle bodies, although not in any sense restricted to such use.

Briefly stated, an important object of this invention is to provide a shade which may be conveniently adjusted from either end thereof to shield the occupants of the vehicle from the objectional sun rays and allow other rays to continue to come into the car.

A further and equally important object of the invention is to provide a shade of the character specified embodying relatively short separate sections which may be adjusted independently of each other and without difficulty on the part of the operator, the shade being provided with means whereby the same is securely held in a fixed or adjusted position.

A further object of the invention is to provide a shade of the character specified which may be easily applied to an automobile body or the like and which may be quickly detached for the purpose of cleaning either the shade or the vehicle body and which may be expeditiously applied again to its original position.

Other objects and advantages will be apparent during the course of the following description.

In the accompanying drawings forming a part of this application and in which like numerals are employed to designate like parts throughout the same, Figure 1 is an elevation of the improved shade applied;

Fig. 2 is a detail sectional view taken on line 2—2 of Fig. 1;

Fig. 3 is a fragmentary sectional perspective of the improved shade, the view illustrating the means for adjustably connecting the shade to the guide rods;

Fig. 4 is a detail sectional view illustrating a slight modification of the invention;

Fig. 5 is a fragmentary perspective illustrating a slight modification of the invention.

In the drawings, the numeral 5 designates a window frame to which fastening members 6 of any character found desirable may be suitably secured. Fig. 1 illustrates that the fasteners 6 have connection with the ends of the serpentine or tortuous guide rods 7 and support these rods at opposite sides of the frame for engagement by the attaching rings 8 at the ends of coil springs 9, the coil springs being extended through the hems 10 of curtain sections 11. Fig. 3 clearly illustrates this and further illustrates that the ends of the coil springs 9 are formed with hooks or attaching members 14 which are extended through the rings. At this point it might be stated that the coil springs are normally slightly less in length than the space between the guide rods 7 and, therefore, the coil springs 9 must be stretched slightly and will hold the rings 9 in engagement with the rods at all times. As the coil springs 9 will hold the rings 8 in engagement with the corrugated side rods 7 the shade sections will remain in adjusted positions and will not slide either up or down as the result of vibration of the vehicle. Furthermore, the connections between the shade sections and the side rods is a noiseless one and one which will not rattle as a result of the movement of the vehicle. The upper and lower shade sections may be adjusted independently of each other for excluding the objectionable light rays and when adjusted will remain in place. It is a simple matter to adjust either or both of the shade sections as it is merely necessary to manually grasp one of the ends of the same and draw the shade section along the rods 7 to the desired position.

Fig. 1 illustrates two possible positions of the shade sections and by reference to this figure it will be seen that the upper section is adjusted to admit some of the light rays, while the lower shade section is adjusted to exclude as much light as possible or to exclude objectionable sun rays. Of course, it is a matter of choice as to which shade may be adjusted. Or the shades may be adjusted according to the position of the sun with respect to the automobile.

In carrying out the invention the coil springs designated by the numeral 30 in Fig. 4 may be provided at the ends thereof with hooks 31 which may be engaged with the apertured ears 32 of sleeves 33, the sleeves 33 being of brass or other suitable material. This figure clearly illustrates that the sleeves 33 are adjustably mounted on vertically arranged coil springs 34, the ends of which are provided with hooks 35 adapted to be engaged with the eyes 36 of attaching screw-eyes 37.

In carrying out this form of the invention, the coil springs 34 (of which there may be two) are stout enough to effectively resist the tendency of the coil springs 30 to draw the springs 34 inwardly toward the center of the window.

Fig. 4 illustrates that the sleeves 33 may be provided with internal lugs 39 adapted to be positioned between the convolutions of the coil springs 34 so as to hold the sleeves in an adjusted position and, therefore, prevent the same from dropping as a result of the movement of the vehicle. While the lugs 39 will prevent accidental dropping of the sleeves 33, they will not prevent the easy adjustment of the sleeves when it is desired to change the positions of the shade sections.

In carrying out the invention, the ends of the guide rods may be provided with double eyes or attaching loops 46 for the reception of fastening screws or the like.

It is desired to point out that in connection with any form of the invention illustrated in this application the shade sections and the guide rods may be easily disconnected for the purpose of cleaning or renewing the shade sections or any of the parts thereof or for the purpose of cleaning the automobile. Or if desired the shade sections may be allowed to remain in place.

The foregoing illustrates that the subject matter of this application is capable of a wide variety of mechanical expressions and it is, therefore, to be understood that the forms of the invention herewith shown and described are to be taken merely as preferred examples of the same and that such minor changes in construction and arrangement of parts may be made as will remain within the spirit of the invention and the scope of what is claimed.

Having thus described the invention, what is claimed is:

1. A window shade comprising a pair of serpentine rods attachable to opposite sides of a window frame, a shade between the rods, and end members carried by the shade and engageable along the rods, said end members being yieldably held to the rods.

2. A window shade comprising a body having hems at the ends thereof, coil springs in said hems, rings having connection with the ends of said coil springs, and serpentine side rods extending through said rings and adapted to hold the same in fixed positions.

3. A window shade comprising a body having hems at the ends thereof, coil springs in said hems, rings having connection with the ends of said coil springs, serpentine side rods extending through said rings and adapted to hold the same in fixed positions, and fasteners for the ends of said serpentine side rods.

4. A window shade comprising a pair of separate sections having the ends thereof provided with hems, coil springs extending through said hems and having hooks, rings engaged with said hooks, and serpentine side rods extending through said rings and adapted to hold said coil springs and the ends of said shade sections in adjusted positions.

In testimony whereof I affix my signature.

GEORGE A. HARRIS.